United States Patent [19]

Todd et al.

[11] 4,274,079

[45] Jun. 16, 1981

[54] APPARATUS AND METHOD FOR DYNAMIC FONT SWITCHING

[75] Inventors: Robert Todd, Farmington Hills; Frank J. Haas, Livonia, both of Mich.

[73] Assignee: Burroughs Corporation, Detroit, Mich.

[21] Appl. No.: 57,070

[22] Filed: Jul. 12, 1979

[51] Int. Cl.³ .............................................. G06K 9/70
[52] U.S. Cl. ........................................... 340/146.3 FT
[58] Field of Search ............ 340/146.3 FT, 146.3 AH, 340/146.3 B, 146.3 Z, 146.3 AQ

[56] References Cited

U.S. PATENT DOCUMENTS

| 3,167,746 | 1/1965 | Reines et al. | 340/146.3 FT |
| 3,444,517 | 5/1969 | Rabinow | 340/146.3 B |
| 3,578,953 | 5/1971 | Milford et al. | 340/146.3 Z |
| 3,643,069 | 2/1972 | Kikuchi | 340/146.3 Z |
| 3,810,094 | 5/1974 | Mori et al. | 340/146.3 AH |
| 3,964,591 | 6/1976 | Hill et al. | 340/146.3 FT |
| 4,021,777 | 5/1977 | Shepard | 340/146.3 AH |

OTHER PUBLICATIONS

Sammon, "Interactive Pattern Analysis and Classification", *IEEE Trans. on Computers*, vol. C-19, No. 7, Jul. 1970, pp. 594-616.

Hunt et al., "Composing Systems, etc.", *IBM Tech. Disclosure Bulletin*, vol. 13, No. 5, Oct. 1970, pp. 1149-1150.

Primary Examiner—Leo H. Boudreau
Attorney, Agent, or Firm—Delbert P. Warner; Charles E. Quarton; Kevin R. Peterson

[57] ABSTRACT

A method and apparatus are provided for dynamically switching between fonts or groups of fonts in an automatic optical character reader. A switch character which is included between a first and second group of characters triggers the selection of the appropriate memory for the succeeding font.

8 Claims, 5 Drawing Figures

FIG. 3. SAMPLE DOCUMENT (FONT 1)

FONT 1 DOCUMENT $$f^1_{jn} \;\text{----}\; f^1_{j3} \quad f^1_{j2} \quad f^1_{j1}$$

FIG. 4. SAMPLE DOCUMENT (FONT 2)

FONT 2 DOCUMENT $$f^2_{\ell m} \;\text{--------------}\; f^2_{\ell 3} \quad f^2_{\ell 2} \quad f^2_{\ell 1}$$

FIG. 5.

MIXED FONT DOCUMENT

FONT 2          FONT 1

$$f^2_{\ell m} \;\text{----}\; f^2_{\ell 2} \quad f^2_{\ell 1} \quad S \quad f^1_{jn} \;\text{----}\; f^1_{j2} \quad f^1_{j1}$$

APPARATUS AND METHOD FOR DYNAMIC FONT SWITCHING

CROSS-REFERENCE TO RELATED APPLICATIONS

This application is related to the application entitled "MULTI-FONT CHARACTER RECOGNITION TECHNIQUE," U.S. Ser. No. 938,850 filed on Sept. 1, 1978, by Robert Todd, assigned to the assignee of the present invention, and said previously filed application is incorporated herein by reference.

BACKGROUND OF THE INVENTION

1. Field of the Invention

This invention relates in general to a method and apparatus for recognizing patterns and in particular to a method and apparatus for dynamically switching between fonts or groups of fonts in a multi-font automatic optical character reader.

2. Description of the Prior Art

In many document processing applications, it becomes necessary to read successive documents which may be encoded with different types of fonts. For example, the usual operation of a remittance processing document sorter involves an operator manually keying in the amount of a check which is to be applied to a given account. For example, when the remittances which are received during a period, such as a day, are to be processed, all of the envelopes which are received are opened. The check of each remitter is stacked together with the respective card or stub which contains information concerning each particular account. This card or stub is typically sent to the remitter, and is returned with her check. The stacked checks and stubs then are placed into a document feeder area at a document sorter whereby the stubs are first read by the document sorter. The stub is then followed by a check of a given amount. The operator of the document sorter then visually reads the amount of the check and then encodes the check with that amount. This operation is done since most document sorters are only capable of reading one type of font, and the font used on checks and remittance stubs are almost always different.

In order to save operator effort, it is well known in prior art to provide an operator actuated key-board switch whereby after a multi-font document sorter has read the stub, the document sorter is triggered to read the magnetic ink characters on the check. The characters on the check are read so that the checks may be sorted according to transit routing numbers. The operator then triggers the document sorter to read the next stub. This procedure, however, still requires considerable operator effort in that the operator must successively trigger the document sorter to read the appropriate font.

Accordingly, it is desirable to provide a method and apparatus wherein the document sorter automatically switches between different fonts without operator intervention.

SUMMARY OF THE INVENTION

It is an object of the invention to reduce operator effort by providing a method and apparatus for dynamically switching between fonts or groups of fonts in an automatic optical character/reader. The basic character recognition approach is fully described in a patent application entitled "MULTI-FONT CHARACTER RECOGNITION TECHNIQUE," U.S. Ser. No. 938,850 filed on Sept. 1, 1978, by Robert Todd, assigned to the assignee of the present invention, and that application is incorporated herein by reference. In general, the memory of the character reader may contain eigenvectors for several different fonts. The character reader recognizes a switch character which is located at the end of a set of characters of a given font. Whenever a switch character is recognized, the character reader is triggered to read a specific type font. Once the characters of that font are read, the character reader then returns to read a specific preselected font. It is to be understood that this invention is applicable to any mixture of documents and any number of fonts. For purposes of explanation, however, the preferred embodiment of the invention illustrates a system wherein two different fonts are read.

BRIEF DESCRIPTION OF THE DRAWING

FIG. 3 is a front view of a document which utilizes a first type of font which is labeled Font 1.

FIG. 4 is a front view of a document which utilizes a second type of font which is labeled Font 2.

FIG. 5 is a front view of a document which utilizes both Font 1 and Font 2.

DESCRIPTION OF THE PREFERRED EMBODIMENT

Figure 1:
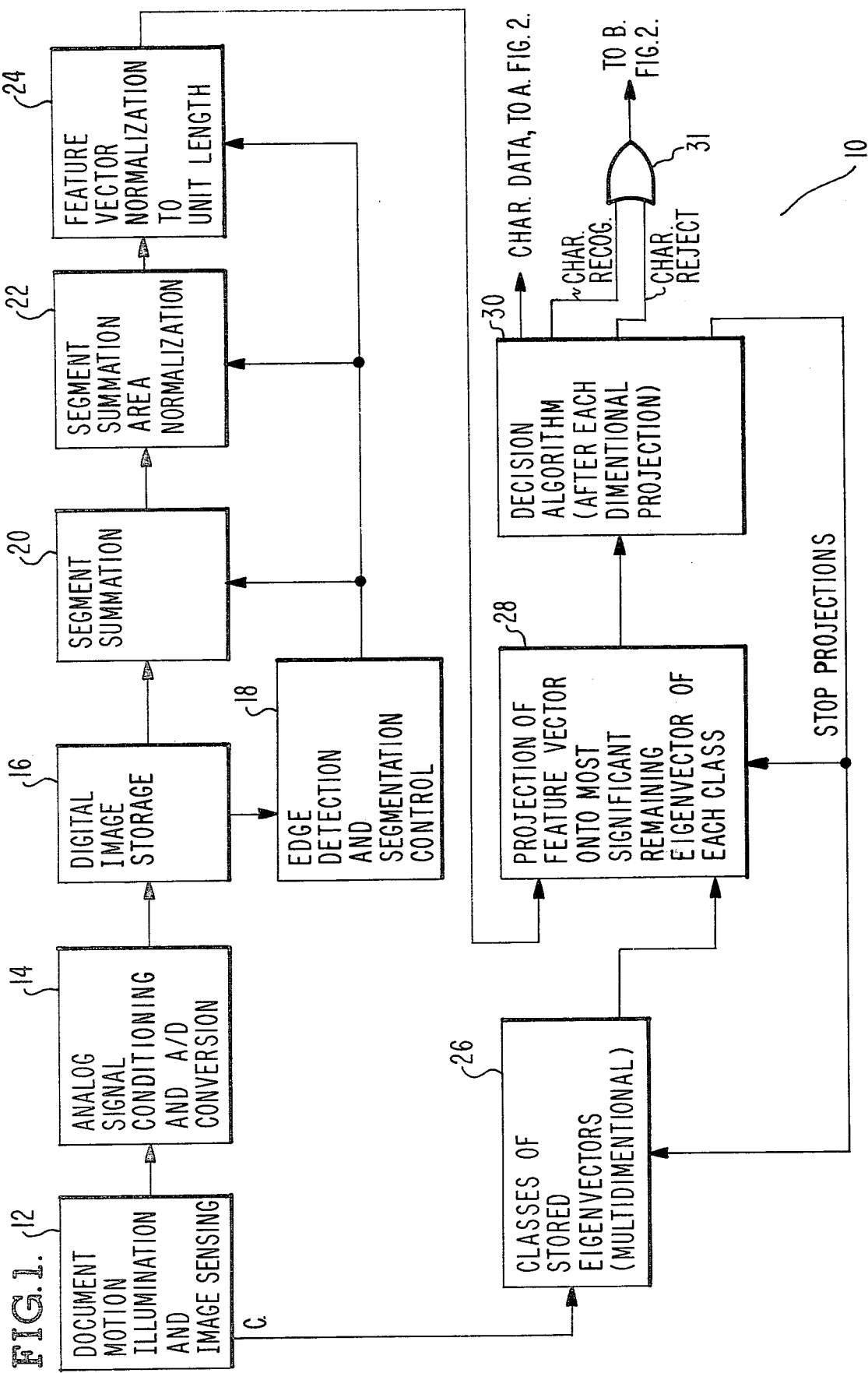
FIG. 1 is a block diagram of a system utilizing a preferred embodiment of the invention.

FIG. 1 shows a block diagram of a character recognition system generally at 10 which utilizes a preferred embodiment of the invention. Although the system of FIG. 1 is explained in detail in the previously referenced patent application entitled "MULTI-FONT CHARACTER RECOGNITION TECHNIQUE," a basic description of the system is set forth below.

The document motion illumination and image sensing block 12 represents the mechanics for driving a document past an optical scanner and includes a light source for illuminating the document. The optical scanner includes a lens for focusing light reflected from the document, an aperture and a photosensitive array. The photosensitive array provides a serial sequence to analog signal conditioning and analog to digital conversion block 14. A document present signal is provided at C to control a JK flip-flop in FIG. 2.

The block 14 receives the serial analog video signals from the block 12, converts these into digital video signals (two bits parallel) and provides these at its output at the same rate it receives the analog signals at its input. These digital video signals are input to a digital image storage block 16.

The block 16 is a matrix of daisy chained shift registers through which the two bit parallel video signals are shifted. The block 16 provides enough storage so that it can contain a complete character to be recognized at once as the character rolls through its shift registers. Attached to block 16 is an edge detection and segmentation control block 18.

The block 18 monitors the contents of the block 16, and locates and keeps track of the bottom, top, right and left edges of each character as it rolls through block 16. Once all the edges of the character are located, its height and width are known and the block 18 segments the character up into 25 subregions in a 5 by 5 manner. Each subregion is approximately the same height and width.

As the two bit parallel video signals sequentially roll out of the storage block 16, a segment summation block 20 sums these up based upon which of the 25 subregions they belong to. The block 20 provides at its output 25 numbers (each 8 bits long). Each number represents the total ink intensity in a corresponding one of the 25 subregions. These 25 numbers are then input to a segment summation area normalization block 22.

The block 22 divides each number by the area of its corresponding subregions because due to physical constraints, not all subregions are exactly the same size. Thus, the block 22 outputs 25 numbers (each 8 bits long) and each number represents the average ink intensity in a corresponding one of the 25 subregions. These 25 numbers output from the block 22 and are treated as a feature vector in 25 dimensional orthogonal space for character recognition purposes. The output of the block 22 is input to a feature vector normalization block 24.

The block 24 takes the feature vector, which is in 25 dimensional orthogonal space, and normalizes it such that it is a unit length in 25 dimensional orthogonal space. Normalizing to unit length is highly desirable because it fixes the binary point with respect to each component of the vector and this in turn simplifies the hardware necessary when the feature vector is later projected onto the eigenvectors.

A block 26 stores the eigenvectors upon which the feature vectors will be projected. Stored in block 26 are at least two sets of 20 classes of eigenvectors (corresponding to the 20 classes of characters to be recognized) with the five most significant eigenvectors for each class contained therein. Each eigenvector has 25 (8 bit) components and has a unit length to simplify the projection hardware. Each set corresponds to a particular font.

A projection block 28 projects the (25 component) feature vector from the block 24 onto the (25 component) eigenvectors from the block 26 one dimension at a time. That is, the feature vector is first projected onto the most significant eigenvector of each of the 20 classes of prototype characters to be recognized. After the first projection is complete, a decision algorithm block 30 decides whether the character has been recognized. If it has been recognized, the projection process is stopped. If it has not been recognized, then the feature vector from the block is projected onto the most significant eigenvector of each class as it is received from the block 26. Such second projection process involves combining the first and second projections of each class to yield enough projections for two dimensions. The decision algorithm of the block 30 is then applied to the 20 net projections to determine if the character has been recognized. If the character has not been recognized, then the projection and decision process is continued for up to the five most significant eigenvectors (corresponding to projection onto five dimensional subspaces). After five dimensional projections and decisions, the character is rejected if it has not been recognized. It should be noted that the projection of the feature vector onto two or more eigenvectors is referred to hereinafter as projecting the feature vector onto predetermined multi-dimensional subspaces. An OR gate 31 acts as an interface between the block 30 and the block 26 (as detailed in FIG. 2).

Briefly, referring to the embodiment of FIG. 1 the blocks 12 through 24 provide generating means for generating a feature vector; block 26 provides a storage means for storing sets of arrays of signals representing each class or character; block 28 provides projecting means for projecting feature vectors onto a set of predetermined classes one dimension at a time; and block 30 provides selector means for selecting one of the characters as the presented character according to a predetermined algorithm and applying the results of the projections after each projection onto a dimension of the subspace.

Figure 2:
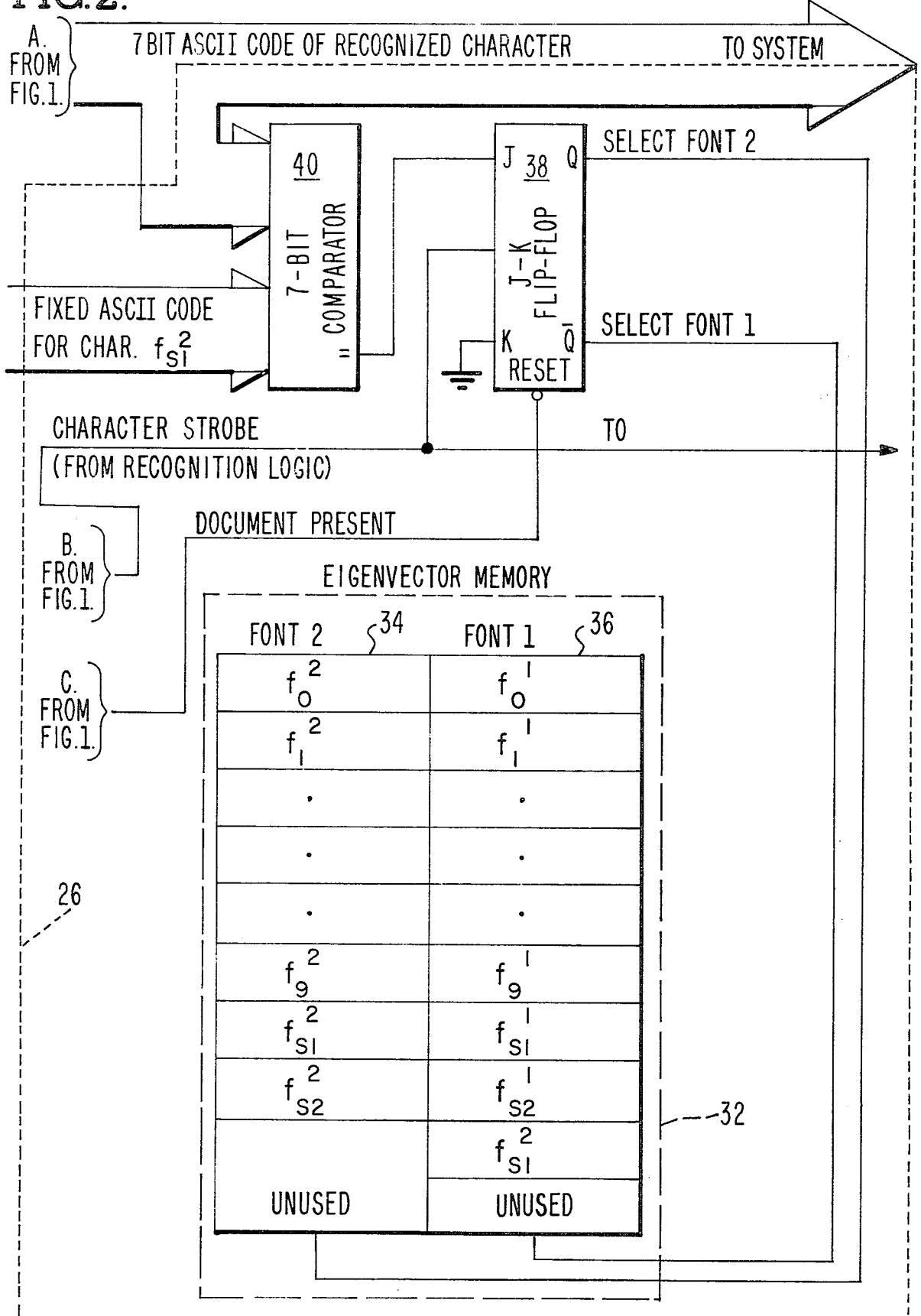
FIG. 2 is a block diagram detailing the preferred embodiment of the invention.

Referring to FIG. 2, the organization of a memory 32 within the multiple classes of stored eigenvectors 26 is shown in detail. The memory 32 is organized into a pair of banks 34 and 36. A first bank 36 contains the eigenvectors of the character from Font 1 plus the eigenvectors for the symbol $f_{S1}{}^2$ from Font 2. Thus, the character $f_{S1}{}^2$, which is referred to herein as a switch character, is included in the recognition of Font 1 characters. The second bank 34 contains only eigenvectors of Font 2 characters. Note that the digits (0–9) and several symbols (designated S1, S2 . . . ) are included for both fonts. When no document is present, a J-K flip-flop 38 is reset. Font 1 is then selected, so that when any document enters the system 10, the system 10 operates with the Font 1 eigenvectors (including $f_{S1}{}^2$). When a character is recognized, the code for that character is strobed to the document reader system 10. At the same time, that code is compared by a comparator 40 to the code for the switch character $f_{S1}{}^2$. If the codes are not equal, the Font 1 eigenvectors remain selected. However, if the codes are equal, indicating that the character $f_{S1}{}^2$ has been recognized, the J-K flip-flop 38 changes state. The Font 2 eigenvectors are then selected, and remain selected for the remainder of the document.

Referring now to FIGS. 2, 3, 4 and 5, in operation, consider the specific case where the documents to be read are a mixture of two fonts on which the information (i.e., the code line) is printed at approximately the same height from the bottom of the document. Suppose that the fonts are labeled simply Font 1 and Font 2. Label the Font 1 characters as $f_{f1}{}^1, f_{f2}{}^1 \ldots f_{fn}{}^1$, and label the Font 2 characters as $f_{f1}{}^2, f_{f2}{}^2 \ldots f_{fn}{}^2$. Documents from the two fonts are then depicted as in FIGS. 3 and 4. The documents are read from right to left.

Returning to FIG. 4, assume that the first character on all Font 2 documents correspond to the switch character $f_{S1}{}^2$. When a Font 2 document enters the reader, the first character is recognized using Font 1 logic. Upon recognizing the character as $f_{S1}{}^2$, the Font 2 recognition logic is selected. The remaining characters $f_{f2}{}^2-f_{fm}{}^2$ are then recognized using Font 2 eigenvectors. A Font 1 document is read using Font 1 eigenvectors, since no switch characters are present. This allows any mix of Font 1 and Font 2 documents to be automatically read in a single pass through the system 10.

Consider now a single document which contains information printed in two fonts (again Font 1 and Font 2), as in FIG. 5. Suppose that the two fonts are printed at the same distance from the bottom of the document, and are separated by some switch character, now called simply S.

The same logic shown in FIG. 2 applies to this mixed font document. The switch character S (previously $f_{S1}{}^2$) is included in the Font 1 eigenvectors. The Font 1 eigenvectors are selected when the document enters the reader, so that the string of Font 1 characters are correctly read. The switch character is recognized using Font 1 eigenvectors, after which Font 2 is selected. The remaining characters are then recognized using Font 2 eigenvectors. Note that the switch character need not be a Font 2 character. The only requirement is that the character S be included with the Font 1 eigenvectors. More than one switch may be included in the string. The switch will occur on the first recognizable switch character. Further switch characters will be recognized if the eigenvectors of S are included in Font 2 memory.

Many other variations of dynamic font switching are possible and easily implemented. Two (or more) switches on the same document can be accomplished by toggling the J-K flip-flop (connect the J and K inputs in FIG. 2). In this case, every time a switch character is recognized, the fonts are switched. This assumes the switch characters eigenvectors are included in both fonts. Multiple switching on different characters can be accomplished by adding another comparator, connecting the equal line to the K input, and organizing the memory.

In summary, dynamic font switching according to the present invention affords a versatile method and apparatus for automatically reading, in a single pass, documents of mixed fonts. The fonts may vary from document to document, or may vary on the same document. The only requirements in the documents are that the coded data be positioned at approximately the same distance from the bottom edge of the documents and that a switch character (or characters) be available.

The invention has been described with reference to a specific embodiment, and it is to be understood that although this embodiment represents the best mode in practicing the invention known to the inventor at the time of filing the patent application, various modifications and additions are possible, and, accordingly, the foregoing description is not to be construed in a limiting sense.

I claim:

1. An apparatus for recognizing a presented pattern as being in one of a plurality of predetermined classes of patterns, having generating means for generating a predetermined combination of signals representing the geometric configuration of the presented pattern, said predetermined combination of signals defining a feature vector of the presented pattern, projecting means for projecting said feature vector onto one of a plurality of sets of predetermined multi-dimensional subspaces, each of said sets characterizing a specific predetermined class of patterns, selector means for selecting one of said patterns as the presented character according to a predetermined algorithm employing the results of said projections prior to said entire projection process being completed wherein the improvement comprises:

switching means operative to sense said presented pattern as being a switch character within one of said predetermined classes of patterns and in response thereto projecting said feature vector onto the set of predetermined multi-dimensional subspaces containing said switch character.

2. The apparatus of claim 1 wherein said switching means further comprises:

comparator means operative to compare said switch character to a fixed character;

a plurality of memories each memory containing a set of vectors characterizing one of said predetermined classes of patterns; and memory switching means responsive to said comparator means operative to connect one of said memories to said projecting means.

3. The apparatus of claim 2 wherein said memory switching means comprises:

a J-K flip-flop.

4. An apparatus for recognizing a presented character as being in one of a plurality of predetermined classes of characters, having generating means for generating a predetermined combination of signals representing the geometric configuration of the presented character, said predetermined combination of signals defining a normalized feature vector of the presented character, storage means for storing a plurality of sets of eigenvectors, each set of eigenvectors being formed from a plurality of prototype vectors representing each class of characters, projecting means for projecting said feature vector onto a set of predetermined multi-dimensional subspaces characterizing the predetermined classes one dimension at a time, the subspaces being in the form of one of said stored sets of eigenvectors wherein each of the subspaces approximates its corresponding prototype vectors in a least mean square root sense, selector means for selecting one of said characters as the presented character according to a predetermined algorithm employing the results of said projections after each projection onto a dimension of the subspace, wherein the improvement comprises:

switching means operative to sense said presented pattern as being a switch character within one of said predetermined classes of characters, and in response thereto projecting said feature vector onto the set of predetermined multi-dimensional subspaces containing said switch character.

5. The apparatus of claim 4 wherein said switching means further comprises:

comparator means operative to compare said switch character to a fixed character;

a plurality of memories each memory containing a set of vectors characterizing one of said predetermined classes of patterns; and memory switching means responsive to said comparator means operative to connect one of said memories to said projecting means.

6. The apparatus of claim 5 wherein said memory switching means comprises:

a J-K flip-flop.

7. A method for recognizing presented patterns each of which is one of a plurality of predetermined classes of patterns, said method comprising the steps of:

generating a predetermined combination of signals each combination representing the geometric configuration of each presented pattern, the present combinations signals defining feature vectors;

projecting the feature vectors onto one of a plurality of sets of predetermined multi-dimensional subspaces each set characterizing a particular predetermined class;

selecting one of the patterns as the presented pattern according to a predetermined algorithm employing the results of the projections prior to the entire projection process being completed;

sensing the existence of a switch character and in response thereto selecting an alternate set of predetermined multi-dimensional subspaces onto which the succeeding feature vectors are projected.

8. A method for recognizing presented characters each of which is one of a plurality of predetermined classes of characters, said method comprising the steps of:
- generating a predetermined combination of signals, each combination representing the geometric configuration of a presented character, the generated combination of signals defining feature vectors;
- storing a plurality of sets of eigenvectors, each set being formed from a plurality of prototype vectors representing each class of characters;
- projecting each of the feature vectors onto a set of predetermined multi-dimensional subspaces characterizing the predetermined classes, one dimension at a time, such subspaces being in the form of one of said sets of eigenvectors wherein each of the subspaces approximates its corresponding prototype vectors in a least mean square error sense;
- selecting one of the characters as the presented character according to a predetermined algorithm employing the results of the projections prior to the entire projection process being completed;
- sensing the existance of a switch character, and in response thereto selecting an alternate set of predetermined multi-dimensional subspaces onto which the succeeding feature vectors are projected.

* * * * *